United States Patent
Wienberg

(10) Patent No.: US 6,637,697 B1
(45) Date of Patent: Oct. 28, 2003

(54) ADHESIVE TAPE AND ITS USE

(75) Inventor: Uwe Wienberg, Uetersen (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/347,323

(22) Filed: Jul. 2, 1999

(30) Foreign Application Priority Data

Jul. 9, 1998 (DE) ...................................... 198 306 674

(51) Int. Cl.$^7$ .............................................. B65H 19/10
(52) U.S. Cl. .................... 242/556.1; 242/556; 428/354; 428/40.1
(58) Field of Search .............................. 242/556.1, 556; 428/354, 40.1, 42.2, 343

(56) References Cited

U.S. PATENT DOCUMENTS

| | | | |
|---|---|---|---|
| 3,915,399 A | * 10/1975 | Kron et al. | 242/58.3 |
| 5,683,807 A | * 11/1997 | Röder et al. | 428/354 |
| 5,692,699 A | * 12/1997 | Weirauch et al. | 242/556.1 |
| 5,901,919 A | * 5/1999 | Wienberg | 242/556.1 |
| 5,916,651 A | * 6/1999 | Wienberg et al. | 428/40.1 |
| 5,996,927 A | * 12/1999 | Weirauch et al. | 242/556.1 |

FOREIGN PATENT DOCUMENTS

| | | |
|---|---|---|
| DE | 196 28 317 A | 1/1998 |
| DE | 196 32 689 A | 2/1998 |
| EP | 0 618 162 A2 | 10/1994 |
| FR | 2 265 649 A | 10/1975 |
| WO | WO 95 29115 A | 11/1995 |

* cited by examiner

*Primary Examiner*—Daniel Zirker
(74) *Attorney, Agent, or Firm*—Norris McLaughlin & Marcus

(57) ABSTRACT

Adhesive tape for the flying splice in paper finishing machines or the like having a paper backing and a water-soluble self-adhesive composition, the paper backing (2) being coated on one side with a water-soluble self-adhesive composition (3), and an edge region of the reverse face of the paper backing (2) being equipped with a double-sided adhesive tape (6) which in turn has a readily splicing paper backing (7) which is equipped on both sides with water-soluble self-adhesive composition (8 or 9) and, in addition, the other edge region of the reverse face of the paper backing (2) being equipped with a narrow strip of a double-sided adhesive tape (14) which in turn has a readily splicing paper backing (15) which is equipped on both sides with water-soluble self-adhesive composition (16 or 17).

10 Claims, 1 Drawing Sheet

ADHESIVE TAPE AND ITS USE

The invention relates to an adhesive tape for the flying splice (flying roll change) in paper finishing machines, rotary printing machines and the like, and to its use accordingly.

Flying splice in papermaking factories or the like is a common technique for replacing an old, almost fully unwound roll of paper by a new roll without having to stop the machines, which run at high speed. This is done using double-sided self-adhesive tapes, known as splicing tapes, which firstly are of high adhesion and high tack but secondly, because of their water-soluble self-adhesive compositions and paper backings, do not interfere with the re-use of paper wastes in the papermaking machine. These splicing tapes are bonded artistically in a zigzag form to the beginning of the web, a procedure requiring experienced personnel, with only about 4–13 minutes remaining for the entire procedure, depending on the working width and form of splice, owing to the high speed of the machines.

Although this technology is well established, it is not without certain disadvantages. Thus experienced personnel are required, the procedure is intrinsically hectic, and the bonds are also relatively thick, since in each case two plies of paper and the adhesive splicing tape in between are the result: a result which is unwanted in the paper industry.

There are various products on the market, known as splicing tapes, for this "butt splicing" in flying splice, which in addition to a paper backing comprise a water-soluble self-adhesive composition coated on both sides. Adhesive tapes of this kind are marketed inter alia under the name tesafix (Beiersdorf).

Also known from EP 418 527 A2 is a method of preparing a roll of printed web material in a roll changer of a rotary printing machine, in which use is made of adhesive strips that are divided into three zones (column 3, line 12 et seq. and FIGS. 1 and 2), the middle zone 6 being perforated. Tearing then takes place at this perforation (column 3, line 35).

Furthermore, DE 40 33 900 A1 discloses an adhesive tape which is suitable for an abovementioned splice and which has greatly differing bond strengths on opposing sides, so that it adheres preferentially to the drum in the course of tearing off (cf. column 2 line 17 et seq.).

In practice, however, such adhesive tapes have serious disadvantages, especially as a result of adhesive areas present following the splice.

Figure 3:
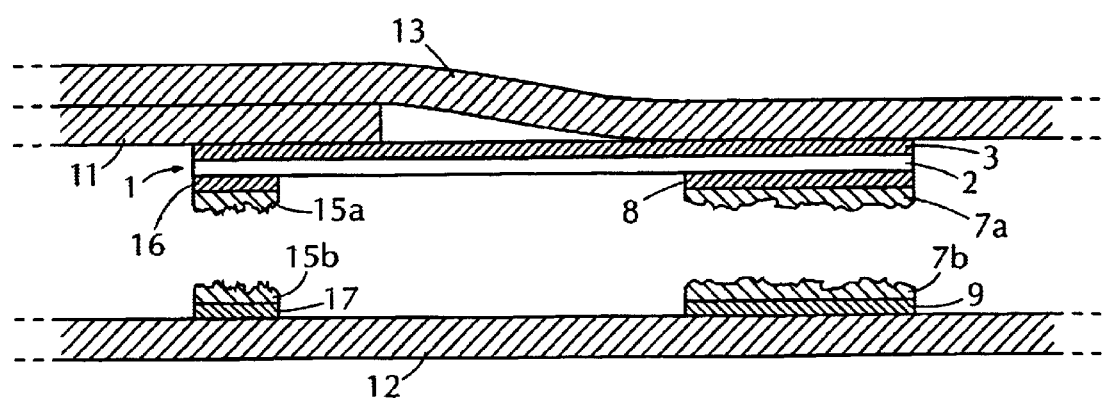

However, DE 196 28 317 A1 has already disclosed an adhesive tape for such applications, in which following the splice there are no longer any adhesive surfaces by virtue of the fact that in that case use is made of a readily splicing paper backing 7 which splits on splicing and following the splice masks the adhesive compositions 8 and 9; cf. FIG. 3. DE 196 32 689 A1 also discloses a similar adhesive tape for this application, although in this case a readily splicing paper backing is employed which splits over the entire width of the adhesive tape; cf. in particular FIG. 3.

Nevertheless, even adhesive tapes of this kind have their disadvantages. When an adhesive tape according to DE 196 28 317 is applied it is found problematic that the end of one roll of paper (referred to as 11 in FIG. 2) retains play because the adhesive tape with its self-adhesive composition 9 is either not yet bonded to the underlying paper web, or the adhesive tape, initially bonded to the lower web, is not yet bonded with the uppermost web, or else, even after complete bonding has taken place, the tape can still easily lift off out from the lower web and in doing so may damage the readily splicing paper backing 7 before the actual splice is attached. In the case of an adhesive tape in accordance with DE 196 32 681, a weak point is evident in particular at the point where, following the splice, the old and the new webs are joined (roughly in the left-hand third of FIG. 3); at this point, it is then easy for a tear to appear, and the splice is therefore unsuccessful.

The object of the invention was to remedy this situation and, in particular, to avoid the disadvantages of the prior art or at least to alleviate them in a manner sufficient for practical purposes.

The invention accordingly provides an adhesive tape as characterized in more detail in the claims. Advantageous embodiments are indicated in the subclaims.

With the adhesive tape of the invention, outstanding splice results are obtained and, in particular, a considerable improvement is achieved over a tape according to DE 196 28 317. That both the treatment of a roll of paper for splicing, and the splice itself, could be significantly facilitated, or improved, by changing the known adhesive tape by placing readily splicing strips of a splicing tape at both rearside edge regions could not have been derived from the prior art.

The invention additionally provides a method using adhesive tapes of this kind, namely a method of flying splice in a paper finishing machine or the like, using an adhesive tape having a paper backing and a water-soluble self-adhesive composition, characterized in that an adhesive tape according to one of the claims is employed and is bonded to the back of part of the topmost web of a new roll of paper, while the double-sided adhesive tapes located on the reverse face of the adhesive tape in turn bond with the underlying web of paper and thus secure the topmost web of paper, whereupon the new roll of paper is placed adjacent to an almost fully unwound old roll of paper that is to be replaced and is accelerated to the same speed as the old roll, and then is pressed against it so that the exposed self-adhesive composition of the adhesive tape bonds with the paper web of the old roll when the webs of paper are at essentially the same speeds, while at the same time the readily splicing paper backings splice in such a way that the self-adhesive compositions with which they were coated are masked non-adhesively by the remains of the said backings, as is depicted in FIG. 3.

In the context of this method it is preferred that first of all only the smaller portion of the slitted liner is peeled away and the adhesive tape is bonded with the exposed portion of the self-adhesive composition behind the topmost web of a new roll of portion, while the larger portion of the liner is not peeled away until shortly before its use for the flying splice.

In practice this enables a single person to prepare and carry out the splicing of a roll of paper 8 m wide, The "flag" of the new roll can, for example, be turned back, i.e. the topmost web of paper is turned upwards. Then an adhesive tape of the invention is bonded to the underlying web, transversely or, in particular, diagonally, with its two strips of a double-sided adhesive tape, while the upper self-adhesive composition is advantageously lined with a release paper. Then in particular the upper region of the release paper is peeled away and the "flag" is placed back over the adhesive tape and stuck down. The projecting portion of the "flag" can then be folded over and separated so that a portion of the adhesive tape is exposed. If desired, the remainder of the release paper is removed and the roll is ready for the splice.

In accordance with the invention, the paper industry is enabled to depart from the butt splicing technique used to date without giving up its advantages. Furthermore, a roll of adhesive tape offered to the user can be given a significantly more uniform configuration, in particular with no tendency towards telescoping. In addition, larger rolls can be made without problems and handled.

On technical grounds and also for reasons of rationalization it is desirable to depart from the known technique of butt splicing with double-sided reprocessible adhesive (splicing) tape in the course of automatic roll changing on coating units. It is now possible to switch to a single-sided, reprocessible adhesive tape, with considerable advantages.

In this bonding technique with an adhesive tape of the invention, an advantageous procedure is to bond the underside of the topmost paper ply (untreated paper) with a single-sided, lined, reprocessible adhesive tape about 75 mm in width (diagonally to the machine direction). The extent of underside bonding should be about 15 mm. Before this underside bonding, the release paper, slitted or perforated to 15 mm, is peeled away. After the release paper has been peeled away, about 60 mm then remains for the actual splicing operation.

The single-sided adhesive tape with the open adhesive-tape side outwards is now available for actual splicing, if any liner present is removed.

When accelerating the paper wind it is necessary to hold the start of the paper (bonding side) fast with the aid of a double-sided adhesive tape (reprocessible). Particularly suitable in this context is a tesafix equipped with a readily splitting paper backing.

Suitable readily splicing/splitting paper backings are those which, when used in accordance with the invention in an adhesive tape, splice/split in the course of the splice carried out with them: the paper tears in the direction of its plane. A simple manual test can be used to determine suitable paper backings: the paper is coated on both sides with a strongly adhesive self-adhesive composition, as is prior art. A strip of such a splicing tape (double-sided adhesive tape) is then bonded between two sheets of writing paper and the sheets are torn apart sharply, vertically with respect to the plane of the sheets. In the course of this procedure, a readily splicing paper backing will split in the plane of the paper, the fragments bonded to the sheets each being covered, on their now exposed rear face, with the residues or part-layers of the split paper backing. A paper backing of this kind is suitable for the invention. In the case of a paper backing which is not readily splicing, the bonded sheets tear while the bond remains intact. A paper backing of this kind is not suitable for the present invention. Therefore, in so far as no sufficient information relating to the splice readiness or splittability of a paper can be obtained from the paper manufacturer, this test can be used to give information rapidly and simply.

The single-sided adhesive splicing tape is fastened to the next paper ply with the aid of these double-sidedly adhesive, readily splicing tesafixes.

In order to prevent the penetration of air when accelerating the paper wind (currently to about 1600 m/min), it is advantageous to bond a strip transversely over the entire paper web.

The advantages achieved in accordance with the invention lie, in particular, in the fact that the bonding site is substantially thinner than previously (resulting in fewer paper breaks) and that there is less machine downtime (increase in efficiency), since a break costs up to DM 30,000. Also, the thickness of the bonding site is advantageously low: currently 2 paper plies plus tesafix adhesive tape (adhesive tape thickness e.g. 0.085 mm), but in accordance with the invention only 1 paper ply plus tesakrepp (adhesive tape thickness e.g. 0.088 mm). This results in a saving in both time and personnel. And, in particular, the attachment of the adhesive tape of the invention to the roll of paper can be brought about easily and securely: the adhesive tape is fixed firmly even when the bonding site is in a vertical position, and the splitting of the two underside-bonded splicing tapes, which takes place rapidly in succession, is advantageous in the case of the ultimate splice.

Figure 1:
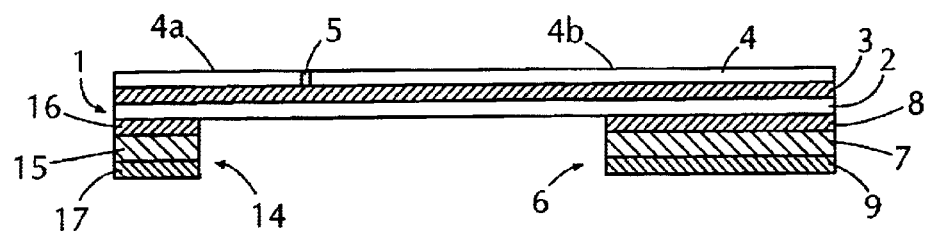
Figure 2:
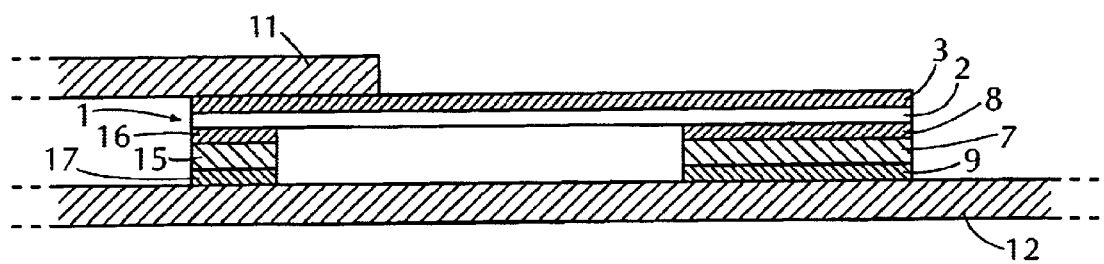

In the text below the intention is to describe the invention in more detail with reference to an exemplary embodiment, without wishing thereby to restrict it unnecessarily. In the drawings:

FIG. 1 shows a lateral, schematic view of an adhesive tape according to the invention, FIG. 2 shows a lateral, schematic view of an adhesive tape according to FIG. 1, bonded to a roll of paper and ready for a flying splice, and FIG. 3 shows a view according to FIG. 2 but after flying splice has taken place.

In detail, FIG. 1 shows an adhesive tape 1 having a backing 2 made of crepe paper, coated on one side with a water-soluble self-adhesive composition 3. The overall thickness of the backing 2 plus self-adhesive composition 3 is 0.08 mm, its width is 75 mm, and it is marketed as tesakrepp 51447 (Beiersdorf, Germany). The self-adhesive composition 3 is lined with a siliconized release paper 4, which is provided at a distance of 15 mm from its left-hand edge with a slit 5, so that the left-hand portion of the release paper 4 can be removed first and then the right-hand portion. At the right-hand end of the adhesive tape 1 a double-sided adhesive tape 6 is bonded underneath, consisting of a readily splicing paper backing 7 coated on both sides with water-soluble self-adhesive composition 8 and 9, respectively. The adhesive tape 6 has a width of 9 mm. Bonded underneath the left-hand end of the adhesive tape 1 is a further double-sided adhesive tape 14, made of the same material as adhesive tape 6, with the readily splicing paper backing 16 coated on both sides with water-soluble self-adhesive composition 15 and 17, respectively; width 3 mm or 6 mm.

The self-adhesive compositions 9 and 17 can also be lined with release paper (not shown).

FIG. 2 shows how such an adhesive tape 1 is bonded behind a paper web 11, namely by the left-hand portion, the portion 4a of the release paper having been peeled away from this portion. The exposed self-adhesive compositions 9 and 17 are bonded to the paper web 12 of a roll of paper, this web lying below the paper web 11. The right-hand portion 4b of the release paper 4 has also been peeled away, so that the roll of paper thus equipped is ready for a flying splice, the bond of the adhesive tape 1 extending obliquely over the roll, in order to avoid a jerk at the moment of the flying splice.

The self-adhesive composition 3 is now exposed and is ready for this flying splice, in a width of 60 mm and over the entire width of the roll of paper.

The (new) roll of paper thus equipped is placed adjacent to the unwound (old) roll of paper to which the new roll is to be attached and is accelerated to the same rotational speed as the said old roll. When this has been done, the change can be executed: the new roll is brought up against the old one, the self-adhesive composition 3 is bonded, in accordance with FIG. 3, with the paper web 13 of the old roll, while the readily splicing paper backings 7 and 15 splice in such a way that portions 7a and 15a, respectively, remain on the adhesive tape 1, where they cover the self-adhesive compositions 8 and 16, respectively, while the other portions 7b and 15b remain on the self-adhesive composition 9 and 17, respectively, which bond to the paper web 12. Therefore, both self-adhesive compositions, 8 and 9 and 16 and 17, respectively, are to a certain extent neutralized, no longer adhere, and thus do not disrupt the subsequent process in the paper machines.

The production of an adhesive tape of the invention takes place in particular such that a strip of a splicing tape with readily splicing backing is laminated onto the non-adhesive reverse face of an adhesive tape 1. The laminate is then cut such that the laminated-on splicing tape with the underlying adhesive tape 1 is separated into two portions, which are then located as adhesive tape 6 and adhesive tape 14, respectively, on the reverse face of the adhesive tape 1. In this case, the cut is preferably located such that the adhesive tape 6 is wider than the adhesive tape 14, especially 2–4 times wider and, preferably, 3 times as wide. However, it is also possible advantageously to cut symmetrical products in which the adhesive tapes 6 and 14 are equal in width.

What is claimed is:

1. An adhesive splicing tape comprising:
   a) a paper backing having first and second faces and comprising a first water-soluble self-adhesive adhered to the first face;
   b) a first double-sided adhesive tape adhered to said paper backing on said second face, said first double-sided adhesive tape comprising a first cleavable backing and second and third water-soluble self-adhesives adhered to opposite sides of said first cleavable backing; and
   c) a second double-sided adhesive tape adhered to said paper backing on said second face, said second double-sided adhesive tape comprising a second cleavable backing and fourth and fifth water-soluble self-adhesive adhered to opposite sides of said second cleavable backing;

wherein said first, second, third, fourth and fifth water-soluble self-adhesives may be the same or different; and whereby said first and second cleavable backings, when the adhesive splicing tape is adhered between a new paper reel and an old paper reel to be replaced by said new paper reel, both of which are in motion, will cleave in two portions between the water-soluble self-adhesives of said first and second double-sided adhesive tapes, such that portions of said first cleavable backing will continue to adhere to and cover said second and third water-soluble self-adhesives, and portions of said second cleavable backing will continue to adhere to and cover said fourth and fifth water-soluble self-adhesives.

2. The adhesive splicing tape according to claim 1, wherein the first water-soluble adhesive is covered with a release liner.

3. The adhesive splicing tape according to claim 2, wherein the release liner comprises a slit.

4. The adhesive splicing tape according to claim 3, wherein the slit is provided at a distance of 15 to 40 mm from an edge of the adhesive splicing tape.

5. The adhesive splicing tape according to claim 1, which is 60 to 80 mm in width, and wherein the first double-sided adhesive tape is 3 to 15 mm in width and the second double-sided adhesive tape is 3 to 15 mm in width.

6. The adhesive tape according to claim 5, wherein the first double-sided adhesive tape is 3 to 10 mm in width and/or the second double-sided adhesive tape is 9 or 10 mm in width.

7. The adhesive tape according to claim 1, wherein an edge of said first double-sided adhesive tape is aligned flush with one edge of said paper backing and an edge of said second double-sided adhesive tape are aligned flush with an opposite edge of said paper backing.

8. The adhesive tape according to claim 1, wherein said first second double-sided adhesive tapes consist of the same materials.

9. A method of splicing a new roll of paper to an unwinding old roll of paper, said method comprising the following steps:
   a) providing an adhesive splicing tape according to any one of claims 1–8;
   b) adhering a first portion of said first water-soluble adhesive to an underside of a topmost web of said new roll of paper;
   c) adhering said first and second double-sided adhesive tapes to an outer surface of an underlying web of said new roll of paper;
   d) accelerating said new roll of paper to the same speed as said unwinding old roll of paper; and
   e) pressing the new roll of paper against said unwinding old roll of paper to adhere a second portion of said first water-soluble adhesive to the unwinding old roll of paper thereby to splice said new roll of paper to said unwinding old roll of paper.

10. The method according to claim 9, wherein the adhesive splicing tape comprises a liner comprising a slit on said first water-soluble adhesive, and a portion of the liner that covers the first portion of the first water-soluble adhesive is peeled away, and the first portion of the first water-soluble adhesive is adhered to the underside of the topmost web of the new roll of paper, and subsequently the portion of the liner that covers the second portion of the first water-soluble adhesive is peeled away, and the second portion of the first water-soluble adhesive is adhered to the unwinding old roll of paper thereby to splice said new roll of paper to said unwinding old roll of paper.

\* \* \* \* \*